United States Patent
Nakata

[11] Patent Number: 5,888,263
[45] Date of Patent: Mar. 30, 1999

[54] METHOD OF ANNEALING A GLASS PRODUCT AND ANNEALING APPARATUS FOR A GLASS PRODUCT

[75] Inventor: Michio Nakata, Funabashi, Japan

[73] Assignee: Asahi Glass Company Ltd., Tokyo, Japan

[21] Appl. No.: 13,907

[22] Filed: Jan. 27, 1998

[30] Foreign Application Priority Data

Jan. 13, 1997 [JP] Japan .................................. 9-019170

[51] Int. Cl.$^6$ .................................................. C03B 25/00
[52] U.S. Cl. .................... 65/117; 65/24; 65/104; 65/118; 65/169; 65/194; 65/269; 65/273; 65/370.1; 65/374.12; 198/793; 198/803.14; 198/867.11; 198/848
[58] Field of Search .......................... 65/24, 104, 117, 65/118, 169, 194, 269, 273, 370.1, 374.12; 198/793, 803.14, 867.11, 848

[56] References Cited

U.S. PATENT DOCUMENTS

| | | |
|---|---|---|
| 564,526 | 7/1896 | Meyer ........................................ 65/117 |
| 829,867 | 8/1906 | Hohl et al. ............................... 198/848 |
| 1,769,818 | 7/1930 | Anderson .................................. 198/848 |
| 1,992,883 | 2/1935 | Pink ......................................... 198/848 |
| 2,123,893 | 7/1938 | Guba ........................................ 198/848 |
| 2,371,747 | 3/1945 | Faris et al. .............................. 198/848 |
| 3,526,207 | 9/1970 | Nadelson ................................. 198/848 |
| 4,906,271 | 3/1990 | D'Iribarne et al. ........................ 65/114 |
| 4,983,205 | 1/1991 | Kuster et al. ......................... 65/374.12 |

FOREIGN PATENT DOCUMENTS 2362  12/1895  United Kingdom ................... 198/848

Primary Examiner—Peter Chin
Assistant Examiner—Michael P. Colaianni
Attorney, Agent, or Firm—Oblon, Spivak, McClelland, Maier & Neustadt, P.C.

[57] ABSTRACT

A mesh belt is stretched in an annealing lehr and a plurality of fine mesh elements, which constitute a fine mesh having gas-permeability and elasticity, formed by weaving a heat-resistant wire, are fixed onto the mesh belt so as to be arranged along the moving direction of the mesh belt with predetermined spaces in the direction of the width of the mesh belt whereby a flaw which may be produced in a glass product to be annealed when it is placed on the mesh belt in the annealing lehr, is prevented.

8 Claims, 2 Drawing Sheets

METHOD OF ANNEALING A GLASS PRODUCT AND ANNEALING APPARATUS FOR A GLASS PRODUCT

BACKGROUND OF THE INVENTION

1. Field of the Invention

The present invention relates to a method of annealing a glass product by transferring a glass product of high temperature on a conveyor constituted by a wire mesh belt having gas-permeability in an annealing lehr. In particular, the present invention relates to an annealing apparatus for annealing a glass product, which can minimize a flaw which may occur in the glass product of high temperature due to the contact with a metallic material and a thermal factor when the glass product is placed on a wire mesh belt, or a flaw which may occur by a shock when the glass product is placed on the mesh belt or a flaw which may occur due to a mechanical factor such as fine vibrations when the glass product on the mesh belt is passed in an annealing lehr.

2. Discussion of Background

Generally, a glass product obtained by molding molten glass is annealed to normal temperature or room temperature with use of an annealing lehr so that a stress produced in a cooling step is reduced. In the annealing lehr, a conveyor of a wire mesh belt is used to successively transfer glass products in the annealing lehr. The mesh belt is generally constituted by a wire net formed by weaving a heat-resistant wire of 2.0–4.0 mm in diameter so as to provide a mechanical strength which is durable to the weight of the glass products and a tension during the transferring of the products.

When a glass product of high temperature is placed on such mesh belt, there may cause a flaw in the glass product due to a temperature difference between the wire and the glass product or a flaw in the glass product at the position in contact with the mesh belt due to a mechanical shock when the glass product is brought to contact with the mesh belt. Or there may cause the adhesion of rust on the wire to the contacting surface of the glass product. Further, as a factor of resulting the flaw in the surface of the glass product, it is considered vibrations in the mesh belt which are produced during the transfer of the glass product in the annealing lehr. When such flaw is produced in the glass product, an amount of work to remove the flaw in a polishing process is very large and efficiency of production is reduced. As a method of preventing the occurrence of a flaw in a glass product, there is a method wherein stands for mounting thereon glass products of high temperature are provided on the mesh belt (for example, JP-A-55-32773). In this method, however, a large burden is required to mount and remove the stands when a large number of glass products are successively produced. Namely, in order to conduct the provision and remove of the stands in a mechanical manner, a complicated equipment for providing and removing the stands is required. When such operations are to be conducted manually, a much labor is required.

SUMMARY OF THE INVENTION

It is an object of the present invention to reduce or eliminate a flaw produced due to a temperature difference between a glass product and a mesh belt or a flaw produced due to a mechanical shock between the glass product and the mesh belt or vibrations of the mesh belt which were unavoidable in the conventional technique, and to provide a method of annealing a glass product which reduces a burden in a polishing process to remove these flaws required in the conventional technique.

It is another object of the present invention to provide a simple annealing apparatus durable to a long term use wherein the mesh belt is provided with a mounting member on which the glass product is placed without any flaw.

In accordance with the present invention, there is provided a method of annealing a glass product which comprises mounting on a mesh belt for a conveyor stretched in an annealing lehr, a fine mesh as a cushion which is constituted by a heat-resistant wire and which has gas-permeability and elasticity capable of absorbing a shock given when a glass product is placed on the mesh belt, placing a glass product having a flat surface or a curved surface on the fine mesh in such a state that the flat surface or the curved surface is directed downward, and annealing the glass product by passing in the annealing lehr.

In the above-mentioned invention, the fine mesh has elasticity capable of absorbing a shock given when the glass product is placed, in at least its front surface portion with which the glass product contacts, wherein the fine mesh is a wire net formed by weaving a single heat-resistant wire of 0.2 to 0.6 mm in diameter or a plurality of twisted heat-resistant wires of less than 0.2 mm in diameter, each having a net pattern of 5 to 20 meshes, the wire being durable to the deterioration in an atmosphere of high temperature in the annealing lehr.

Further, in accordance with the present invention, there is provided a fine mesh having gas-permeability which can hold a glass product to be annealed in thermally, physically stable manner, the fine mesh is a member formed by weaving a heat-resistant wire, which has elasticity capable of absorbing a shock even when the glass product is placed on the fine mesh.

Further, in accordance with the present invention, there is provided an annealing apparatus for a glass product which comprises a mesh belt for a conveyor stretched in an annealing lehr, a fine mesh mounted on the mesh belt at the side where the glass product is placed, a driving roller for drivingly moving the mesh belt, and rollers for holding in a stretching state the mesh belt, wherein the fine mesh comprises a plurality of fine mesh elements which are arranged in the moving direction of the mesh belt with predetermined spaces in the direction of the width of the mesh belt, and annular grooves are formed in an outer circumferential portion of the rollers which are brought to contact with the surface of the mesh belt on which the glass product is placed so that the fine mesh elements are received in the grooves so as not to cause the contact of the rollers with the fine mesh elements.

In the present invention, the glass product has a flat surface or a slightly protruded or recessed curved surface, and it is annealed in a state that such a surface is directed downward. There is no limitation of the shape and the size with respect to the glass product. Generally, the object to be treated in the present invention is a glass product in which a flaw is apt to occur due to a temperature difference between the glass product and the wire conveyor belt when the glass product is directly placed on the mesh belt for a conveyor in the annealing lehr, or due to a mechanical shock at the time of contacting the glass product with the mesh belt. A typical example of the glass product is a cathode ray tube panel for TV which is heavy and is of a hollow glass ware in a box-like shape, and is required to have optical characteristics and strength.

In the present invention, the glass product is placed for annealing on the fine mesh mounted on the mesh belt. The fine mesh is fixed to the mesh belt so that it can be used continually. Use of the fine mesh is fundamentally different from the conventional technique in which the stands were supplied on the mesh belt at the inlet of the annealing lehr and removed at the outlet of the annealing lehr where the glass products annealed were taken out, and the supply and remove of the stands were conducted every annealing operations.

The fine mesh has gas-permeability and elasticity which is capable of absorbing or reducing a shock even when a glass product is placed on the fine mesh. If the fine mesh does not have good gas-permeability, an air stream or heat is blocked by the fine mesh in the annealing lehr and it is impossible to uniformly anneal the glass product.

In the present invention, the fine mesh having good gas-permeability and an appropriate elasticity can be formed by weaving a heat-resistant wire. The elasticity is provided by the inherent elasticity of the wire used. For the wire, a heat-resistant steel wire or a stainless steel wire which is durable to a repeated use in the annealing lehr of high temperature is preferable. In forming the fine mesh by using the wire, a single wire or a plurality of twisted thin wire are used. The diameter of the wire can suitably be selected in consideration of durability to an atmosphere of high temperature and elasticity capable of reducing a shock to the glass product. When the single wire is used, a diameter of 0.2–0.6 mm is desirable, and when the plurality of twisted thin wires are used, a diameter of less than 0.2 mm, in particular, less than 0.1 mm is desirable. Further, it is important for the wire to have a relatively small thermal capacity so that the temperature of the glass product and the temperature of the wire are quickly uniform when the glass product of high temperature comes to contact with the wire.

The fine mesh can be formed to have a mesh-like body or a non-woven ribbon-like body by using the heat-resistant wire. The fine mesh of mesh-like body is generally formed by overlaying a plurality of wire nets. A combination of the mesh-like body and the non-woven ribbon-like body may be used. In this case, the non-woven ribbon-like body is used as a core material, and an outside or an outer surface of the core material is covered by the mesh-like body. In particular, a front surface portion of the fine mesh on which the glass product is placed should be formed by using a wire net of 5–20 meshes to provide a stable supporting plane in order to eliminate a danger of occurrence of a flaw. The width of the fine mesh is determined depending on the size and shape of the glass product to be annealed.

The fine mesh is attached to the mesh belt on the side where the glass product is placed so that it is repeatedly usable together with the mesh belt for a conveyor. A heat-resistant wire is generally used to fix the fine mesh. In this case, the fine mesh which is generally in a ribbon-like shape is arranged on the mesh belt in a form of row in the moving direction of the mesh belt, more specifically, it is arranged in a linear form. Since the mesh belt generally has a width of about 200–500 cm, a plurality of rows of fine mesh are arranged with predetermined spaces in the direction of the width of the mesh belt.

Besides the fine mesh arranged as a continuous ribbon-like body on the mesh belt in its moving direction, the fine mesh may be divided into separate bodies on which a single or a plurality of glass products are placed. Even in this case, the fine mesh is arranged linearly along the moving direction of the mesh belt in view of a constructional requirement which is described hereinafter.

In the present invention, a unique contrivance is so made as to maintain the fine mesh mounted on the mesh belt to be rich in elasticity constantly. In the annealing lehr, the mesh belt for a conveyor is stretched in an endless-belt-like form by means of a plurality of rollers, and is driven by a driving roller as a part of a mechanism for the mesh belt. The mesh belt in the annealing lehr is supported flatwise by means of rail-like or plate-like supporting members provided under the mesh belt.

Some of rollers arranged in a lower portion of the annealing lehr are in contact with the side of the mesh belt where the glass product is placed. In the mesh belt used in the present invention, the fine mesh is mounted on its surface side where the glass product is placed and the fine mesh projects from the surface of the mesh belt. In the conventional technique, rollers having a cylindrical rolling surface are used. Accordingly, the rolling surface is brought to contact with the fine mesh projecting from the mesh belt whereby the fine mesh is pressed by the rollers. As a result, the fine mesh loses its elasticity. Further, the shape of the fine mesh on which the glass product is placed is deformed, or the fine mesh is sometimes broken.

In consideration of the above, in the present invention, an annular groove or annular grooves are formed in an outer circumferential portion of the rollers contacting with the fine mesh at positions corresponding to the fine mesh so that the fine mesh can be received in the annular grooves and it does not contact with the roller surfaces. The annular grooves can easily be formed by shaving the roller surface or by providing annular projections on the roller surface. The width of the annular grooves is determined in consideration of the width of the fine mesh and the depth is determined in consideration of the height of the fine mesh.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
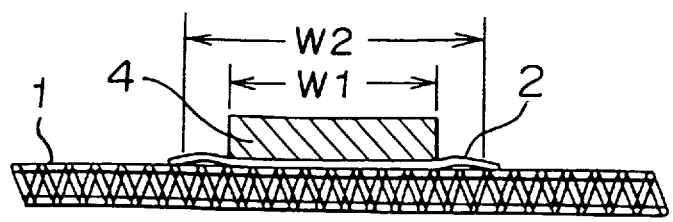
FIG. 1 is a cross-sectional view of an embodiment of a method of annealing a glass product having a flat surface according to the present invention.

Preferred embodiments of the present invention will be described with reference to the drawings wherein the same reference numerals designate the same or corresponding parts.

FIG. 1 shows an example of annealing a glass product 4 having a large wall thickness and a flat surface. A fine mesh 2 is fixed onto a mesh belt 1 as a transferring means for the glass product 4 by means of a heat-resistant wire of about 1 mm in diameter (not shown). This example is in a case that the width W1 of the glass product 4 is smaller than the width W2 of the fine mesh 2.

Figure 2:
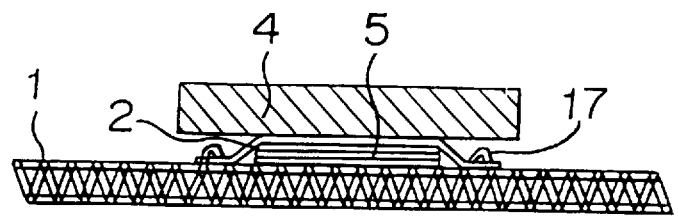
FIG. 2 is a cross-sectional view showing another embodiment of the method of annealing a glass product having a flat surface according to the present invention.

A case that the width of the glass product 4 is larger than the width of the fine mesh 2 will be described. As shown in FIG. 2, wire nets 5 are stacked in a multi-layered form, and a fine mesh 2 having a width larger than the wire nets 5 is overlaid so as to wrap the stacked wire nets 5. Then, both sides of the fine mesh 2 are fixed to the mesh belt 1 by using a heat-resistant wire 17. Thus, the contact of the glass product 4 with the wire 17 can be prevented.

Figure 3:
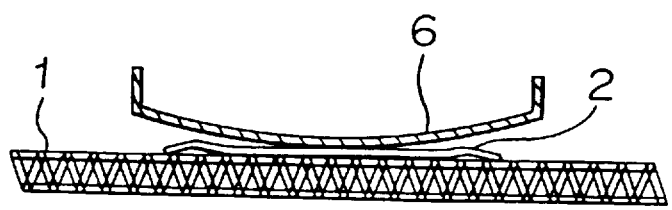
FIG. 3 is a cross-sectional view showing a method of annealing a cathode ray tube panel for TV according to the present invention.

FIG. 3 shows an example of a glass product 6 having a slightly protruded curved face, e.g., a cathode ray tube panel for TV. In this case, only a central portion of the curved surface contacts with the fine mesh 2. Accordingly, it is unnecessary to make the width of the fine mesh larger than the glass product. Further, the fine mesh 2 having a multi-layered structure can provide a more suitable elasticity. The effect of the fine mesh can reduce a drop impact caused when the glass product 6 is placed on the mesh belt 1; can absorb vibrations produced in the mesh belt or the glass product during the transfer in the annealing lehr, and can prevent occurrence of a flaw due to a mechanical impact to or slippage of the glass product 6.

Figure 4:
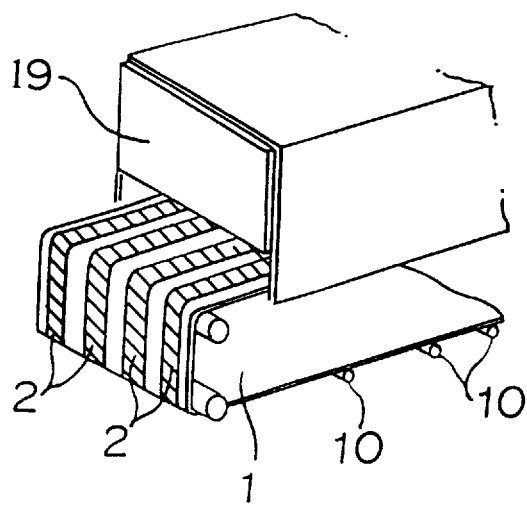
FIG. 4 is a perspective view partly omitted showing an inlet portion of an annealing lehr used for the present invention.

FIG. 4 shows an inlet portion of the annealing lehr 19 used for the present invention. Ribbon-like fine mesh elements 2, each of which is formed to have four layers in a braid-over-braid form by using a stainless steel wire of 0.35 mm in diameter, are arranged linearly on the mesh belt 1 in the moving direction of the mesh belt, and each of the fine mesh elements 2 is fixed to the mesh belt 1 by fixing both longitudinal side portions by using a stainless steel wire of 1 mm in diameter. In this embodiment, four rows of ribbon-like fine mesh elements 2 are fixed in the direction of the width of the mesh belt 1. Reference numeral 10 designates grooved rollers which will be described later.

A cathode ray tube panel for TV (as shown in FIG. 3) to be introduced in the annealing lehr is transferred in a state that its protruded curved surface is directed downward, to an inlet portion of the annealing lehr by means of a transferring machine, and is dropped onto the fine mesh 2 from a height of about 10 mm. The panel is annealed in this state while it is passed in the annealing lehr together with the mesh belt 2. An impact at the dropping can be reduced by ⅙ by using the fine mesh 2 in comparison with the case that the glass product is directly dropped onto the mesh belt 1.

In a test wherein a cathode ray tube panel for TV having a weight of 5 kg was dropped on a pressure sensitive paper, it was found that the drop impact was 30 $kgf/cm^2$ in a case without using the fine mesh while the drop impact could be reduced to about 5 $kgf/cm^2$ in a case of using the fine mesh 2 having a four-layered structure.

Figure 5:
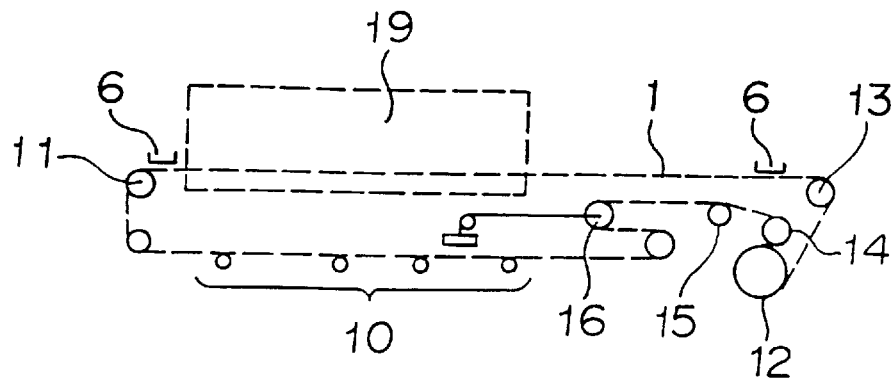
FIG. 5 is a diagram showing an embodiment of the structure of an annealing apparatus according to the present invention.

FIG. 5 is a diagram showing an embodiment of the annealing apparatus of the present invention in which a driving system for driving the mesh belt through the annealing lehr is shown. The glass product 6 to be annealed is supplied from the side of a supporting roller 11 disposed at the inlet portion of the lehr and is taken out at the portion of a supporting roller 13 during which the glass product 6 is passed through the annealing lehr main body 19 to be annealed. The mesh belt 1 is continually moved by means of a driving roller 12 so as to circulate through the annealing lehr. In such mesh belt driving system, a group of rollers 14, 15, 16 and 10 which are disposed in a lower portion of the annealing lehr are in contact with a front surface of the mesh belt 1 on which the fine mesh 2 is mounted. In the present invention, however, grooved rollers in which annular grooves are formed are employed so that the fine mesh 2 does not contact with the rollers.

Figure 6:
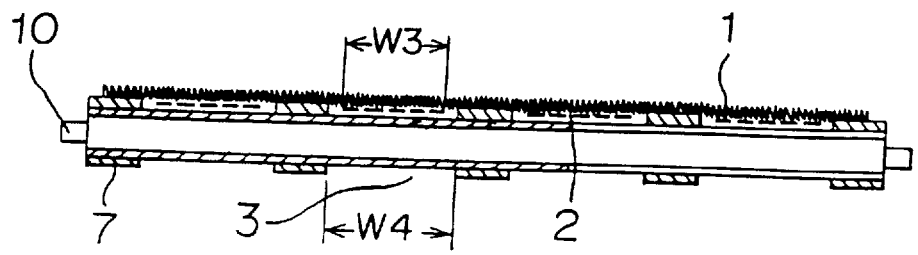
FIG. 6 is a longitudinal cross-sectional view showing a mesh belt and a grooved roller in the present invention.

FIG. 6 shows the mesh belt 1 in contact with a grooved roller among the group of rollers 10. The grooved rollers other than the rollers 10 are substantially same. In the grooved roller 10, annular grooves 3 are provided by forming annular projections 7 made of a hard rubber, for example. The annular grooves 3 may be formed by shaving an outer circumferential surface of the roller or by using another method.

Since the fine mesh 2 mounted on the mesh belt 1 is received in the space of the annular groove 3 while the mesh belt is driven, it does not contact with the surface of the roller 10. In this case, it is necessary that the width of the annular groove 3 has a sufficient dimension so that the fine mesh 2 does not contact with the annular projection 7 even when the mesh belt 1 is slightly deflected. In FIG. 6, W3 represents the width of the fine mesh 2 and W4 represents the width of the annular groove 3.

According to the present invention, since the fine mesh mounted on the mesh belt has an appropriate elasticity, it absorbs or reduces a shock caused when a glass product is placed on the mesh belt and fine vibrations of the mesh belt produced in the annealing process. Accordingly, a possibility of occurrence of a flaw in the glass product due to the contact with the fine mesh in the annealing process can be reduced and hence, a burden of polishing to remove a flaw can be reduced. Further, by reducing the thermal capacity of the fine mesh, a temperature difference to the glass product during the annealing is reduced. Accordingly, a cooling rate in the annealing lehr can be increased, and a time for annealing can remarkably be shortened.

Further, since the fine mesh is fixed to the mesh belt, it can repeatedly be used as a one-piece body with the mesh belt. Further, the fine mesh has an appropriate gas-permeability because of its having a mesh-like structure or a non-woven structure of wire. Accordingly, the glass product can be annealed or cooled uniformly.

Further, annular grooves are provided in an outer surface of the rollers which are contact with the surface of the mesh belt on which the fine mesh is mounted. Accordingly, the fine mesh are received in the grooves during the operation of the mesh belt so that the outer circumferential surface of the rollers does not contact with the fine mesh. Accordingly, the elasticity or the shape of the fine mesh can be kept in an excellent state.

Obviously, numerous modifications and variations of the present invention are possible in light of the above teachings. It is therefore to be understood that within the scope of the appended claims, the invention may be practiced otherwise than as specifically described herein.

What is claimed is:

1. A method of annealing a glass product which comprises:

mounting on a mesh belt used as a conveyor in an annealing lehr, a plurality of fine mesh elements constituted by a heat-resistant wire and which has gas permeability and elasticity sufficient for absorbing a shock given when a glass product is placed on the mesh belt;

spacing the plurality of fine mesh elements with predetermined spaces therebetween, in the direction of a width of the mesh belt;

placing a glass product having a flat surface or a curved surface on the plurality of fine mesh elements in such a state that the flat surface or the curved surface is directed downward; and annealing the glass product by passing it through the annealing lehr.

2. A method of annealing a glass product according to claim 1, wherein the plurality of fine mesh elements have elasticity sufficient to absorb a shock produced when at least a front surface portion of the glass product contacts the plurality of fine mesh elements, wherein the plurality of fine mesh elements are formed of a wire net formed by weaving a single heat-resistant wire of 0.2 to 0.6 mm in diameter or a plurality of twisted heat resistant wires of less than 0.2 mm in diameter, each having a net pattern of 5 to 20 meshes, the wire being durable to the deterioration in an atmosphere of high temperature in the annealing lehr.

3. A method of annealing a glass product according to claim 1, wherein the plurality of fine mesh elements comprise a core portion which is constituted by a plurality of overlaid wire nets or a non-woven wire body, and a wire net which covers an outer side of the core portion and which is formed by weaving a wire thinner than the wire forming said wire nets or the non-woven wire body to have a net pattern of 5 to 20 meshes.

4. A method of annealing a glass product according to claim 1, wherein the plurality of fine mesh elements are fixed to the mesh belt for a conveyor stretched in the annealing lehr by means of a heat-resistant wire.

5. A method of annealing a glass product according to claim 1, wherein the glass product is a cathode ray tube panel for TV.

6. An annealing apparatus for a glass product, comprising:
a mesh belt for a conveyor stretched in an annealing lehr;
a driving roller for drivingly moving the mesh belt;
rollers for holding, in a stretching state, the mesh belt,
a plurality of fine mesh elements mounted on a side of the mesh belt upon which the glass product is placed and arranged in the moving direction of the mesh belt with predetermined spaces in the direction of the width of the mesh belt; and
a plurality of annular grooves formed in an outer circumferential portion of the rollers which contact the surface of the mesh belt on which the glass product is placed so that the plurality of fine mesh elements are received in the plurality of annular grooves such that the rollers do not contact the plurality of fine mesh elements.

7. An annealing apparatus for a glass product according to claim 6, wherein each of the plurality of fine mesh elements comprise ribbon members continuously extensible in the moving direction of the mesh belt.

8. A method of annealing a glass product according to claim 1, wherein the step of spacing the plurality of fire mesh elements further comprises the step of:
aligning the plurality of fine mesh elements with annular grooves formed in an outer circumferential portion of rollers which contact the surface of the mesh belt on which the glass product is placed such that the plurality of fine mesh elements are received in the grooves and the rollers do not contact the plurality of fine mesh elements.

* * * * *

UNITED STATES PATENT AND TRADEMARK OFFICE
CERTIFICATE OF CORRECTION

PATENT NO. : 5,888,263
DATED : March 30, 1999
INVENTOR(S) : Michio NAKATA

It is certified that error appears in the above-identified patent and that said Letters Patent is hereby corrected as shown below:

On the title page, item [30], the Foreign Application Priority Data should read:

--Jan. 31, 1997 [JP] Japan .................................................9-019170--

Signed and Sealed this

Twenty-fourth Day of August, 1999

Attest:

Q. TODD DICKINSON

*Attesting Officer*  *Acting Commissioner of Patents and Trademarks*